US011379941B2

United States Patent
Martin et al.

(10) Patent No.: US 11,379,941 B2
(45) Date of Patent: Jul. 5, 2022

(54) PRIMITIVE SHADER

(71) Applicants: Advanced Micro Devices, Inc., Sunnyvale, CA (US); ATI Technologies ULC, Markham (CA)

(72) Inventors: Todd Martin, Orlando, FL (US); Mangesh P. Nijasure, Orlando, FL (US); Randy W. Ramsey, Orlando, FL (US); Michael Mantor, Orlando, FL (US); Laurent Lefebvre, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 1044 days.

(21) Appl. No.: 15/415,823

(22) Filed: Jan. 25, 2017

(65) Prior Publication Data

US 2018/0082399 A1    Mar. 22, 2018

Related U.S. Application Data

(60) Provisional application No. 62/398,211, filed on Sep. 22, 2016.

(51) Int. Cl.
  *G06T 1/20*    (2006.01)
  *G06T 15/00*   (2011.01)
  *G06T 15/40*   (2011.01)

(52) U.S. Cl.
  CPC .............. *G06T 1/20* (2013.01); *G06T 15/005* (2013.01); *G06T 15/40* (2013.01); *G06T 2200/04* (2013.01)

(58) Field of Classification Search
  CPC ......... G06T 15/005; G06T 15/40; G06T 1/20; G06T 2200/04
  USPC ....................................................... 345/421
  See application file for complete search history.

(56) References Cited

U.S. PATENT DOCUMENTS

| 7,830,392 B1* | 11/2010 | Danskin | G09G 5/363 |
| | | | 345/612 |
| 8,704,836 B1* | 4/2014 | Rhoades | G06T 11/40 |
| | | | 345/502 |
| 9,536,341 B1* | 1/2017 | Rhoades | G06T 15/005 |
| 9,824,412 B2* | 11/2017 | Sharma | G06T 15/405 |

(Continued)

OTHER PUBLICATIONS

Imagination Technologies Limited: "PowerVR Hardware Architecture Overview for Developers", Dec. 15, 2015, pp. 1-15.

(Continued)

*Primary Examiner* — Hilina K Demeter
(74) *Attorney, Agent, or Firm* — Volpe Koenig

(57) ABSTRACT

Improvements in the graphics processing pipeline are disclosed. More specifically, a new primitive shader stage performs tasks of the vertex shader stage or a domain shader stage if tessellation is enabled, a geometry shader if enabled, and a fixed function primitive assembler. The primitive shader stage is compiled by a driver from user-provided vertex or domain shader code, geometry shader code, and from code that performs functions of the primitive assembler. Moving tasks of the fixed function primitive assembler to a primitive shader that executes in programmable hardware provides many benefits, such as removal of a fixed function crossbar, removal of dedicated parameter and position buffers that are unusable in general compute mode, and other benefits.

18 Claims, 10 Drawing Sheets

(56) References Cited

U.S. PATENT DOCUMENTS

| | | | |
|---|---|---|---|
| 2011/0080406 A1* | 4/2011 | Hakura | G06T 15/50 345/426 |
| 2013/0265309 A1 | 10/2013 | Goel et al. | |
| 2014/0098117 A1* | 4/2014 | Goel | G06T 15/005 345/522 |
| 2016/0005140 A1* | 1/2016 | Engh-Halstvedt | G06T 15/005 345/506 |
| 2016/0035129 A1* | 2/2016 | Bolz | G06T 1/20 345/420 |
| 2016/0048999 A1* | 2/2016 | Patney | G06T 17/205 345/426 |
| 2016/0086299 A1 | 3/2016 | Sharma et al. | |

OTHER PUBLICATIONS

A. Vajda, "Chapter 2—Multi-core and Many-core Processor Architectures", Programming Many-core Chips, 2011, pp. 9-43.

PCT Search Report and Written Opinion, dated Oct. 10, 2017, 8 pages.

Gee, K., "Introduction to the Direct3D 11 Graphics Pipeline", Presented at NVISION 08, Aug. 25-27, 2008, 55 pgs., NVIDIA, San Jose, CA, USA.

* cited by examiner

PRIMITIVE SHADER

CROSS-REFERENCE TO RELATED APPLICATIONS

This application claims priority to U.S. Provisional Patent Application Ser. No. 62/398,211, entitled "NEXT GENERATION GRAPHICS," and filed on Sep. 22, 2016, the entirety of which is hereby incorporated herein by reference.

TECHNICAL FIELD

The disclosed embodiments are generally directed to graphics processing pipelines, and in particular, to a primitive shader.

BACKGROUND

Three-dimensional graphics processing pipelines accept commands from a host (such as a central processing unit of a computing system) and process those commands to generate pixels for display on a display device. Graphics processing pipelines include a number of stages that perform individual tasks, such as transforming vertex positions and attributes, calculating pixel colors, and the like. Graphics processing pipelines are constantly being developed and improved.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to improvements in the graphics processing pipeline. More specifically, a new primitive shader stage performs tasks of the vertex shader stage or a domain shader stage if tessellation is enabled, a geometry shader if enabled, and a fixed function primitive assembler. The primitive shader stage is compiled by a driver from user-provided vertex or domain shader code, geometry shader code, and from code that performs functions of the primitive assembler. Moving tasks of the fixed function primitive assembler to a primitive shader that executes in programmable hardware provides many benefits, such as removal of a fixed function crossbar, removal of dedicated parameter and position buffers that are unusable in general compute mode, and other benefits.

Figure 1:
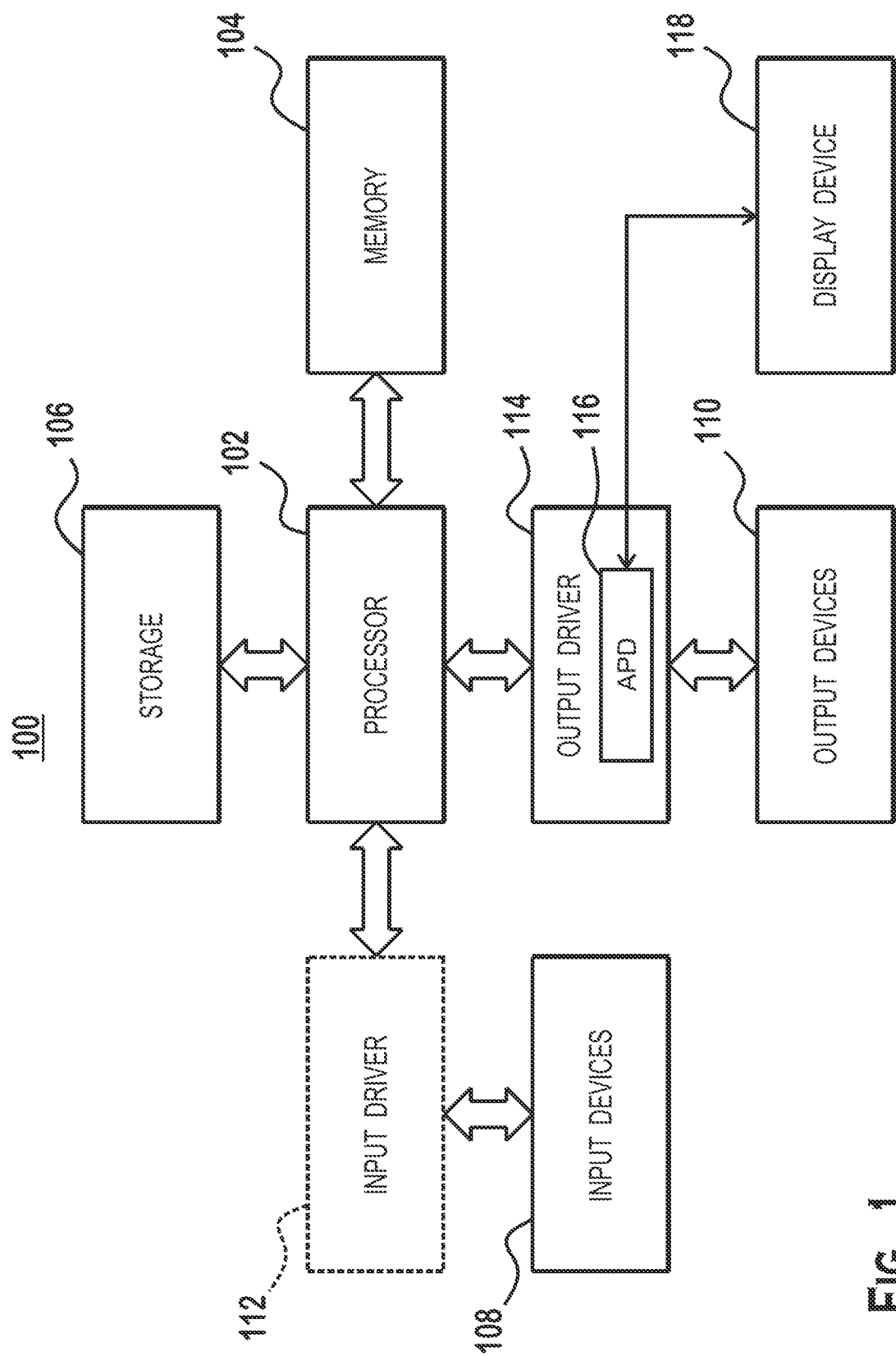
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also optionally includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2:
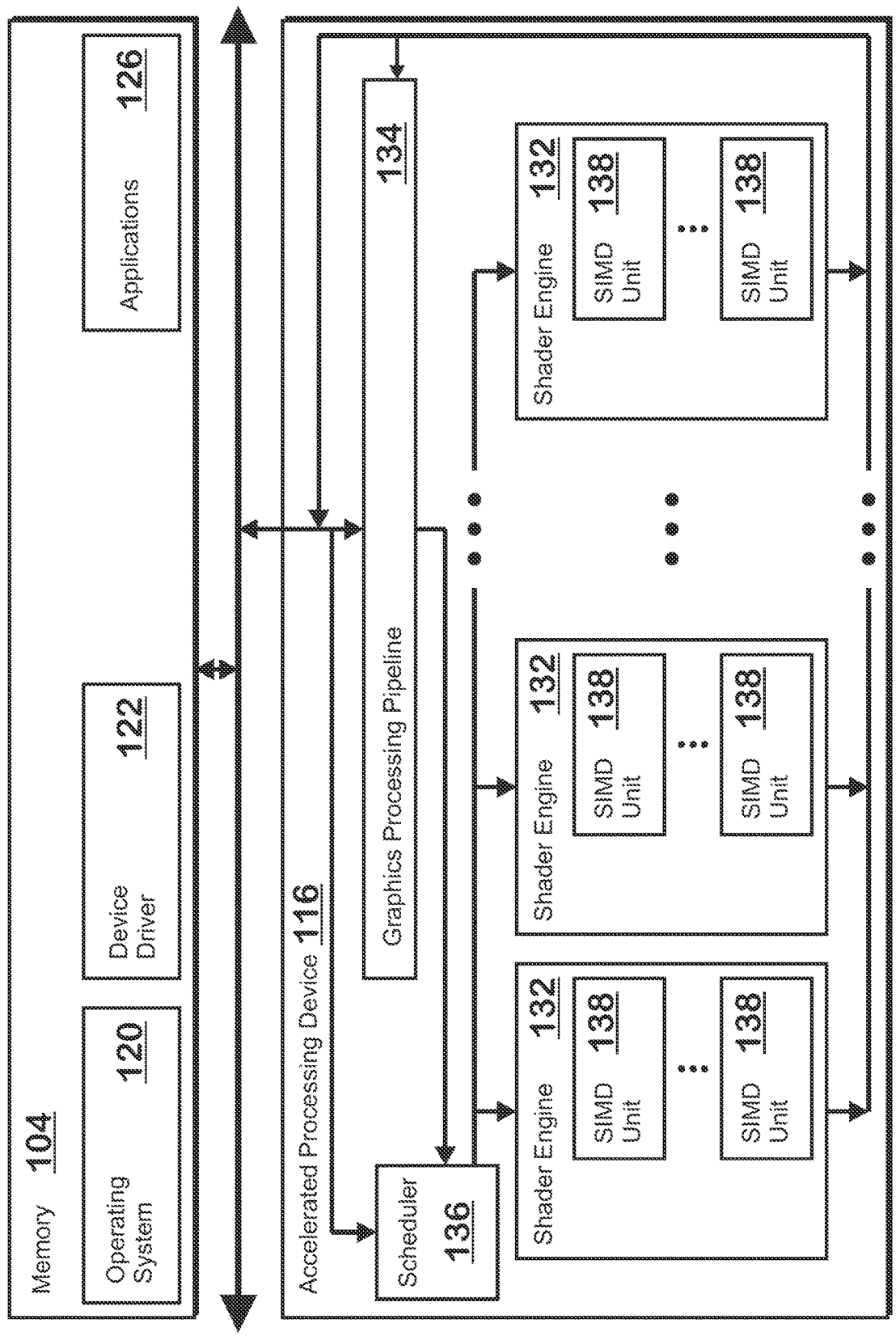
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126, and may optionally include other modules not shown. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader code into shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline.

The APD 116 includes shader engines 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in shader engines 132 is a work-item. Each work-item represents a single instantiation of a shader program that is to be executed in parallel in a particular lane. Work-items are typically executed simultaneously as a "wavefront" on a single SIMD unit 138. Multiple wavefronts are be included in a "work group," which includes a collection of work-items designated to execute the same program. A work group is executed by executing each of the wavefronts that make up the work group. The wavefronts may executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data). A scheduler 136 is configured to perform operations related to scheduling various wavefronts on different shader engines 132 and SIMD units 138, as well as performing other operations for orchestrating various tasks on the APD 116.

The parallelism afforded by the shader engines 132 is suitable for graphics related operations such as pixel value calculations, vertex transformations, tessellation, geometry shading operations, and other graphics operations. A graphics processing pipeline 134 which accepts graphics processing commands from the processor 102 thus provides computation tasks to the shader engines 132 for execution in parallel.

The shader engines 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs," which may be compiled by the driver 122) that define such computation tasks to the APD 116 for execution.

Figure 3A:
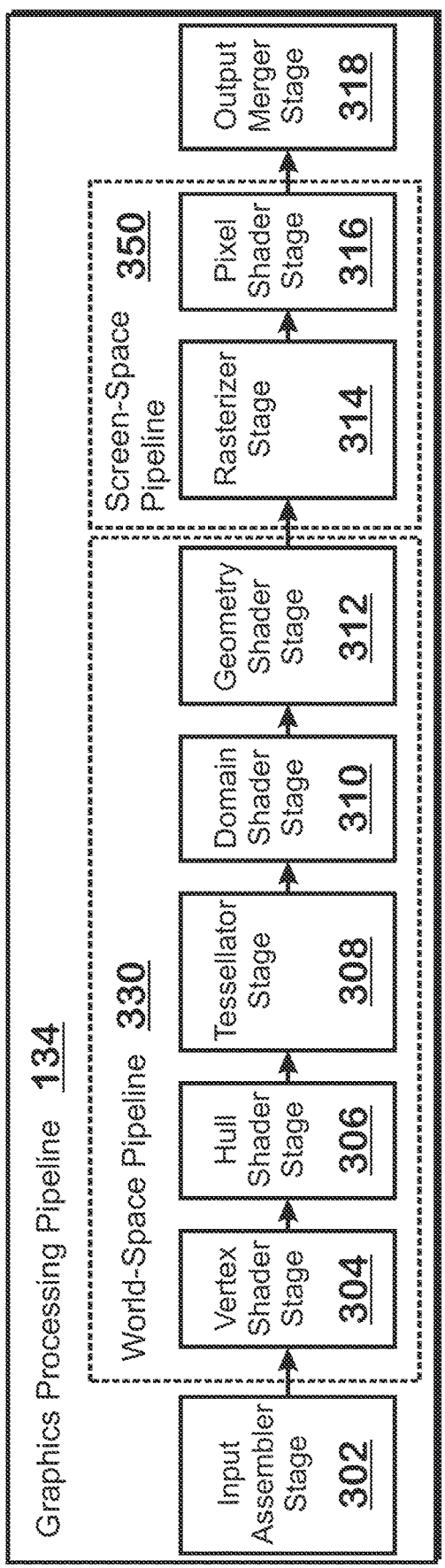
FIGS. 3A-3C illustrate additional details of the graphics processing pipeline illustrated in FIG. 2.

FIG. 3A is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. As used herein, the term "user" refers to the application 126 or other entity that provides shader code and three-dimensional objects for rendering to the graphics processing pipeline 400. The term "user" is used to distinguish over activities performed by the APD 116. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transforms are considered to modify the coordinates or "position" of the vertices on which the transforms are performed. Other operations of the vertex shader stage 304 that modify attributes other than the coordinates are considered to modify non-position attributes. Non-position attributes are also referred to herein as "parameters."

The vertex shader stage 304 is implemented partially or fully as vertex shader programs to be executed on one or more shader engines 132. The vertex shader programs are provided by the processor 102 as programs that are pre-written by a computer programmer. The driver 122 compiles such computer programs to generate the vertex shader programs having a format suitable for execution within the shader engines 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive defined by a set of vertices and other information. The tessellator stage 308 generates a set of samples (which includes vertices specified by barycentric coordinates) for the patch. The domain shader stage 310 calculates vertex positions for the vertices corresponding to the samples for the patch (by, for example, converting the barycentric coordinates to world-space coordinates). The hull shader stage 306 and domain shader stage 310 can be implemented as shader programs to be executed on the programmable processing units 202.

The geometry shader stage 312 is able to be selectively enabled or disabled and performs operations on a primitive-by-primitive basis. Geometry shader programs typically accept whole primitives (e.g., a collection of vertices) as input and perform operations on those whole primitives as specified by the instructions of the geometry shader programs. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. Operations for the geometry shader stage 312 are performed by a shader program that executes on the programmable processing units 202.

The rasterizer stage 314 accepts and rasterizes simple primitives (also referred to as "triangles" at the end of the world-space pipeline 330) generated upstream. Rasterization consists of determining which screen pixels (or sub-pixel samples) are covered by a particular primitive. Rasterization is performed by fixed function hardware or may be performed by shader programs executing in the programmable processing units 202.

The pixel shader stage 316 calculates output values (e.g., color values) for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel, which are written to a frame buffer for output to the display device 118.

The vertex shader stage 304, hull shader stage 306, tessellator stage 308, domain shader stage 310, and geometry shader stage 312, are part of the world-space pipeline 330, which generates triangles and various attributes for the triangles, for processing by the screen-space pipeline 350. The screen-space pipeline 350, which includes the rasterizer stage 314 and the pixel shader stage 316, determines what screen pixels are covered by the triangles received from the world-space pipeline 330, determines what colors should be written to those screen pixels, and outputs the colors to the screen for display (via the output merger stage 318 and other components not shown).

As described above, the APD 116 is a massively parallel computing device. Many techniques are used to parallelize the processing associated with rendering three-dimensional objects. One such technique involves including multiple world-space pipelines 330 and multiple screen-space pipeline 350, each of which processes independent work in parallel. Such a technique is described with respect to FIGS. 3B and 3C.

Figure 3B:
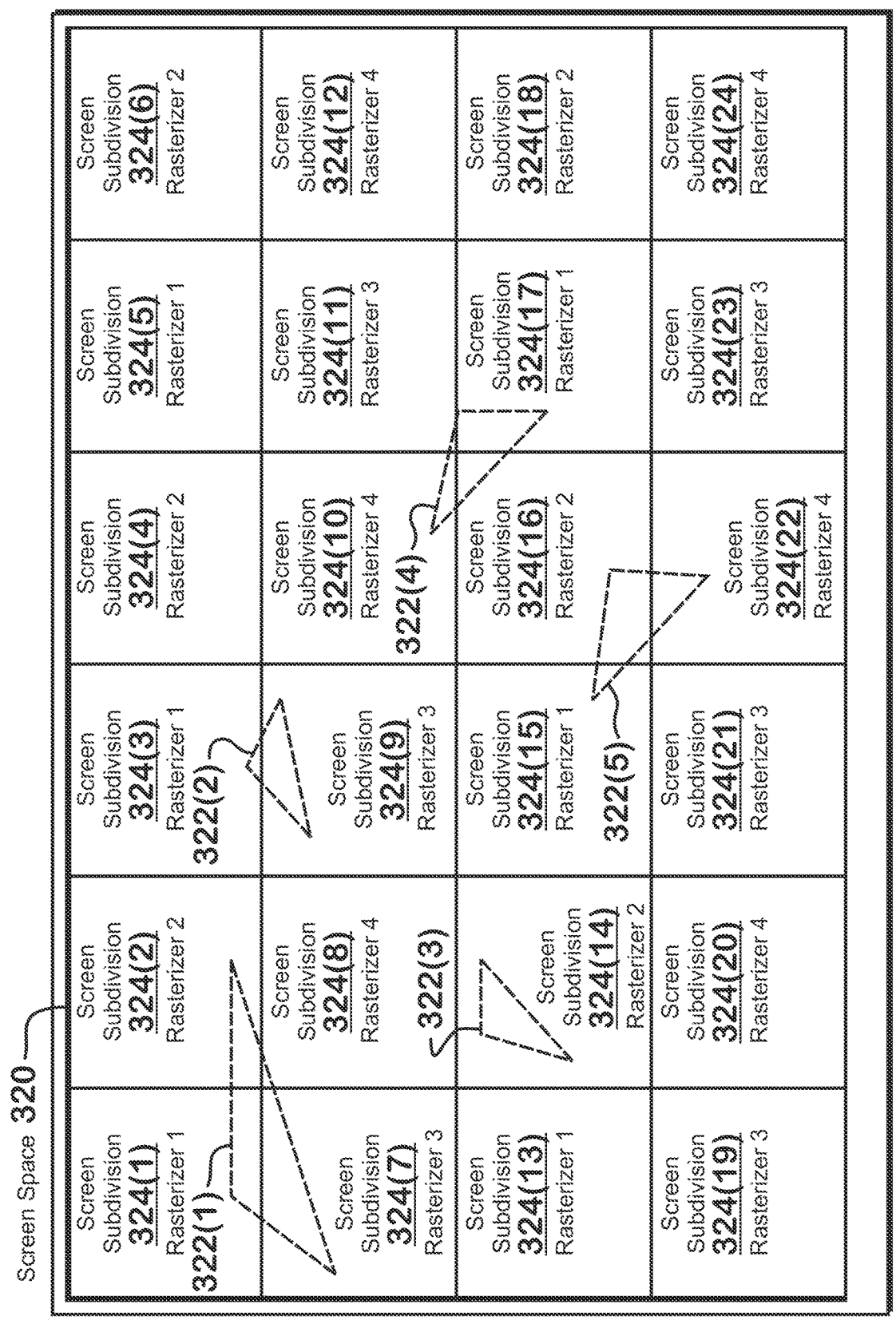
Figure 3C:
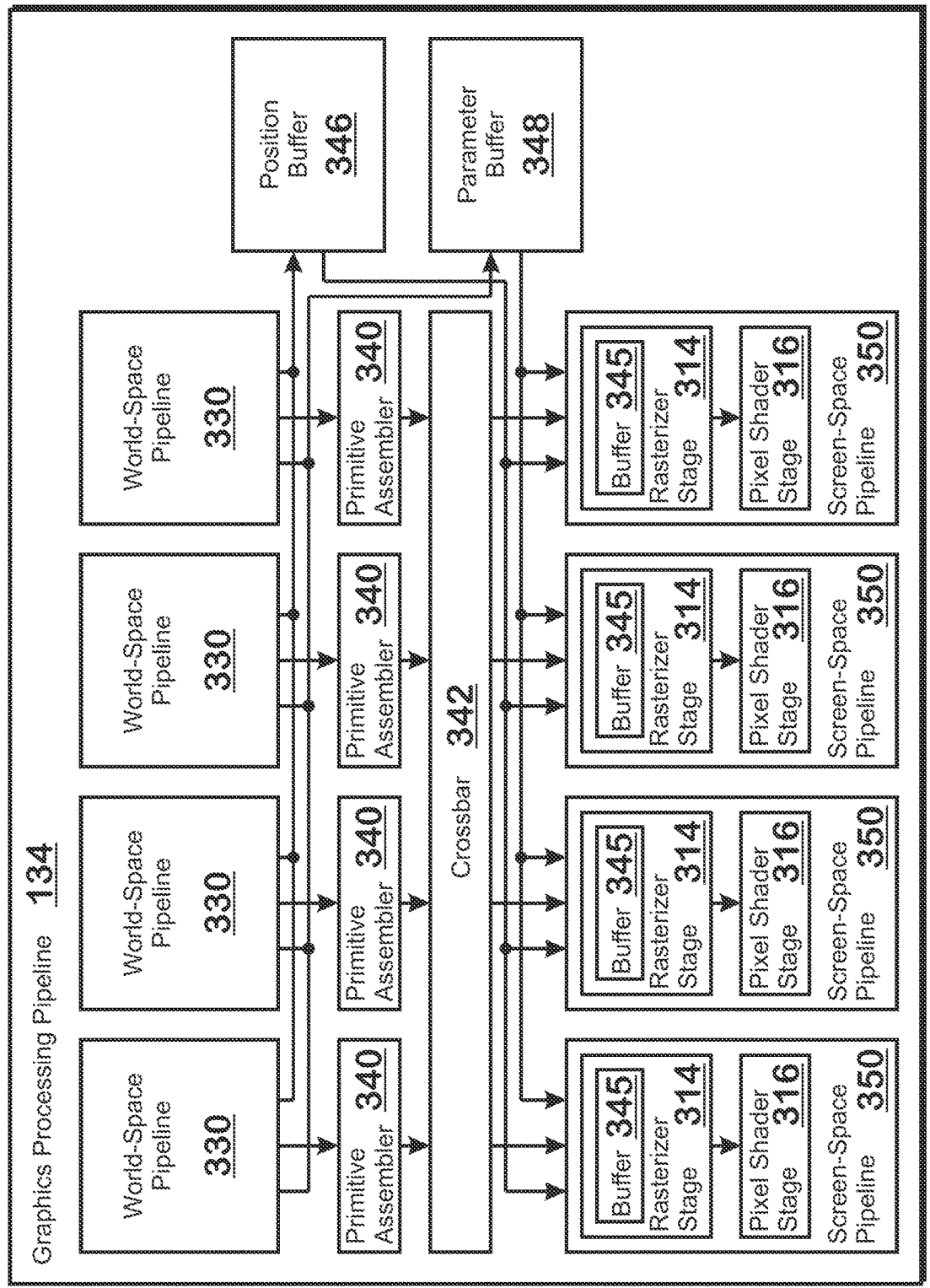

FIG. 3B illustrates a screen space 320 (which represents the area to which pixel colors generated by the pixel shader stage 316 are to be written, for output to a display (such as a frame buffer that stores pixel colors for output to a monitor), or for generation of a surface that can be used for other purposes (e.g., as a texture)) and divisions of that screen space 320 into multiple screen subdivisions 324(1) of the screen space 320. FIG. 3C illustrates multiple world-space pipelines 330, multiple screen-space pipeline 350, and various other components involved with facilitating operation of the world-space pipelines 330 and screen-space pipelines 350 in a parallel manner.

Referring momentarily to FIG. 3C, multiple world-space pipelines 330 are illustrated. The input assembler stage 302 distributes three-dimensional elements (such as vertices, tessellation data, primitives, and the like) among the different world-space pipelines 330. In one example, the input assembler stage 302 provides a first set of vertices to a first world-space pipeline 330, a second set of vertices to a second world-space pipeline 330, and so on. A world-space pipeline 330 processes the vertices and passes processed vertices to a primitive assembler 340 associated with that world-space pipeline 330. Each primitive assembler 340 is assigned to a specific world-space pipeline 330. The world-space pipelines 330 also pass processed vertex positions to the position buffer 346 and pass non-position parameters (e.g., lighting data, texture coordinates, or the like) to the parameter buffer 348. The position buffer 346 and parameter buffer 348 are memory spaces specifically dedicated for use by the world-space pipelines 330, to store vertex positions and non-position vertex parameters, respectively. These buffers store the respective data for use by the screen-space pipeline 350.

The primitive assemblers 340, which are implemented in fixed function hardware and not as shader programs executing on the programmable processing units 202, collect vertices from the associated world-space pipeline 330 into primitives, perform culling operations (e.g., back-face culling, frustum culling, view culling), identify the screen-space subdivision 324 (FIG. 3B) to which a particular primitive belongs, and pass the primitives and the determinations of which screen-space subdivisions 324 a primitive belongs to to the crossbar 342 for distribution to the screen-space pipelines 350.

The crossbar 342 receives the primitives from the primitive assemblers 340 and passes the primitives to the one or more screen-space pipelines 350 associated with the screen subdivision 324 identified by the primitive assembler 340 for the primitives. The crossbar 342 is also implemented as fixed function hardware, as opposed to shader programs that execute on the programmable processing units 202. The hardware of the crossbar 342 is complex and consumes a lot of die area because the primitive descriptions output by the primitive assemblers 340 are typically large, and also because the crossbar 342 is capable of passing primitives from any world-space pipeline 330 to one or more of any screen-space pipeline 350, which results in a large number of physical electrical connections. The screen-space pipelines 350 process the primitives received from the crossbar 342 to output colors for pixels substantially as described above with respect to FIG. 3A.

Referring back to FIG. 3B, each screen-space pipeline 350 is assigned to a specific set of screen subdivisions 324 in the screen space 320. In FIG. 3B, each screen subdivision 324 is indicated as being associated with a particular rasterizer stage 314 of a particular screen-space pipeline 350 (and thus with a specific screen-space pipeline 350, since each rasterizer stage 314 is within a particular screen-space pipeline 350). For example, screen subdivision 324(1), screen subdivision 324(3), screen subdivision 324(5), screen subdivision 324(13), screen subdivision 324(15), and screen subdivision 324(17) are all associated with rasterizer 1, and thus the crossbar 342 transmits triangles that cover those screen subdivisions 324 to the screen-space pipeline 350 associated with rasterizer 1. Other screen subdivision 324 are associated with different rasterizers (2, 3, and 4) and primitives that cover those screen subdivisions 324 are transmitted to the associated rasterizers.

Several example triangles 322 are illustrated in FIG. 3B to show the manner in which those triangles 322 are distributed to the different screen-space pipelines 350 based on which screen subdivision 324 the triangles 322 cover. The example triangle 322(1) covers screen subdivision 324(1), screen subdivision 324(2), screen subdivision 324(7), and screen subdivision 324(8). Thus, triangle 322(1) would be transmitted to all four rasterizers (and thus all four screen-space pipelines 350). Triangle 322(2) covers screen subdivision 324(3) and screen subdivision 324(9) and would thus be transmitted to rasterizer 1 and rasterizer 3. Triangle 322(3) covers only screen subdivision 324(14) and would thus be transmitted to rasterizer 2. Triangle 322(4) covers screen subdivision 324 for all four rasterizers and would thus be transmitted to all rasterizers. Triangle 322(5) covers screen subdivision 324(15), screen subdivision 324(16), and screen subdivision 324(22) and would thus be transmitted to rasterizers 1, 2, and 4, but not to rasterizer 3.

Referring back to FIG. 3C, there are several performance issues associated with the fixed function primitive assemblers 340 and the crossbar 342 implementation, as well as with the dedicated position buffer 346 and dedicated parameter buffer 348. In one example, this configuration can result in a bottleneck due to limited space in the buffers 345 that buffer incoming primitives from the crossbar 342. More specifically, primitives are rendered in what is called "API" order ("application programming interface order"). API order mandates that objects are rendered in the order requested by the application 126 that requested those objects to be rendered. This ordering constraint means that each screen-space pipeline 350 performs their respective operations in API order (some operations may occur out of order, but it must appear to the application 126 that requested the objects to be rendered that they were rendered in the order specified). A bottleneck can result, however, where there are a lot of triangles that are sent to multiple screen-space pipelines 350 (via the screen-subdivision 324 coverage technique described with respect to FIG. 3B), and where one (or more) screen-space pipeline 350 is more "favored" than others. More specifically, after the crossbar 342 transmits primitives to a screen-space pipeline 350, the buffer 345 stores the primitive for processing by the rasterizer stage 314 of that screen-space pipeline. If a buffer 345 is full, then the crossbar 342 cannot transmit more primitives to the screen-space pipeline 350 that includes that buffer 345.

A situation can arise in which the buffer 345 for one screen-space pipeline is full and other buffers 345 are not full, but the other screen-space pipelines 350 cannot proceed regardless. More specifically, if a buffer 345 is full, then the crossbar 342 cannot transmit more primitives to the screen-space pipeline 350 with that buffer 345. However, the crossbar 342 cannot subsequently process another primitive that would be assigned to the screen-space pipeline 350 with the full buffer 345. Thus, if that primitive overlaps screen subdivisions 324 other than the screen subdivision 324 associated with the full buffer 345, then screen-space pipelines 350 other than the screen-space pipeline 350 with the full buffer 345 are effectively stalled even though the buffers 345 for those screen-space pipelines 350 are not full. This stalling generally occurs because of the limited capacity of the memory elements dedicated for the purpose of transmission of triangles from the world-space pipelines 330 to the screen-space pipelines 350.

Another issue with the architecture of FIG. 3C is that the crossbar 342 itself is large and complex and consumes a large amount of die area. Additionally, it is technically very difficult or infeasible for the crossbar 342 to be larger than a 4×4 crossbar 342 (four inputs and four outputs), meaning that the number of world-space pipelines 330 and screen-space pipelines 350 is limited. A further issue is that because culling operations occur in the primitive assemblers 340, some operations that occur in the vertex shader, such as determining vertex non-position parameters, are unnecessary. More specifically, attributes may be determined for shaded vertices that are eventually dropped due to culling.

Figure 4A:
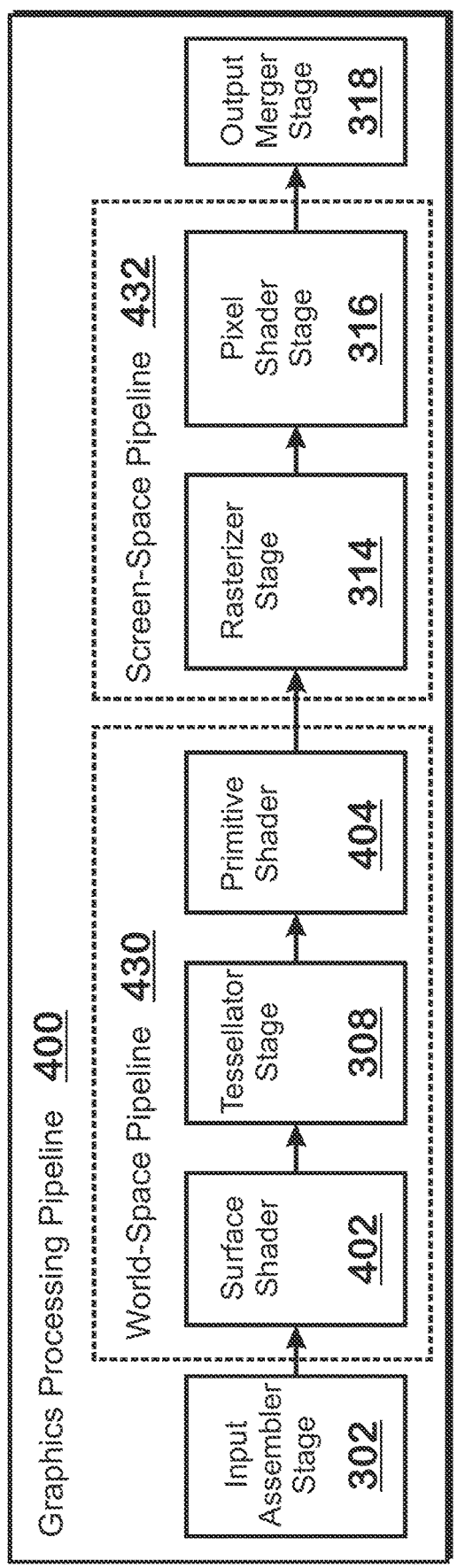
FIG. 4A illustrates a modified graphics processing pipeline that allows for more flexible processing in the world-space pipeline and more flexible transmission from a world-space pipeline to a screen-space pipeline, according to an example.

For at least the above reasons, a different technique for transmitting data from the world-space pipelines 330 to the screen-space pipelines 350 is described below. FIG. 4A illustrates a modified graphics processing pipeline 400 that allows for more flexible processing in the world-space pipeline and more flexible transmission from a world-space pipeline 430 to a screen-space pipeline 432.

The graphics processing pipeline 400 is similar to the graphics processing pipeline 134 illustrated in FIG. 3A, and is used in the APD 116 of FIG. 2, except that the world-space pipeline 430 is modified. The screen-space pipeline 432 of the graphics processing pipeline 400 performs roughly the same functions as the screen-space pipeline 350 of the graphics processing pipeline 134 of FIG. 3A. The world-space pipeline 430 includes a surface shader 402 and a primitive shader 404. The surface shader 402 is enabled when tessellation is enabled. When tessellation is enabled, the surface shader 402 implements the functionality of the vertex shader stage 304 and the hull shader stage 306. The tessellator stage 308 is still implemented in fixed function hardware. The surface shader 402 is disabled when tessellation is disabled. The surface shader 402 is implemented partially or fully as a shader program executing on the parallel processing units 202.

When tessellation is enabled, the primitive shader 404 implements the functionality of the domain shader stage 310 and the geometry shader stage 312 if the geometry shader stage 312 is active. When tessellation is disabled, the primitive shader stage 404 implements the functionality of the vertex shader stage 304. The primitive shader 404 and the surface shader 402 are implemented partially or fully as shader programs that execute on the programmable processing units 202. Portions of the primitive shader 404 and surface shader 402 not implemented as shader programs are implemented in fixed function hardware.

The primitive shader 404 performs certain functions of the primitive assembler 340 of FIG. 3C. Specifically, the primitive shader 404 assembles primitives, performs culling, and determines which screen subdivision 324 the primitives overlap. These operations are performed in a single shader stage as opposed to in a combination of shader stages and fixed function hardware. The primitive shader 404 is processed as a single shader program type, compiled by the driver 122 from user-provided code and from other instructions available to the driver 122 or the APD 116.

Figure 4B:
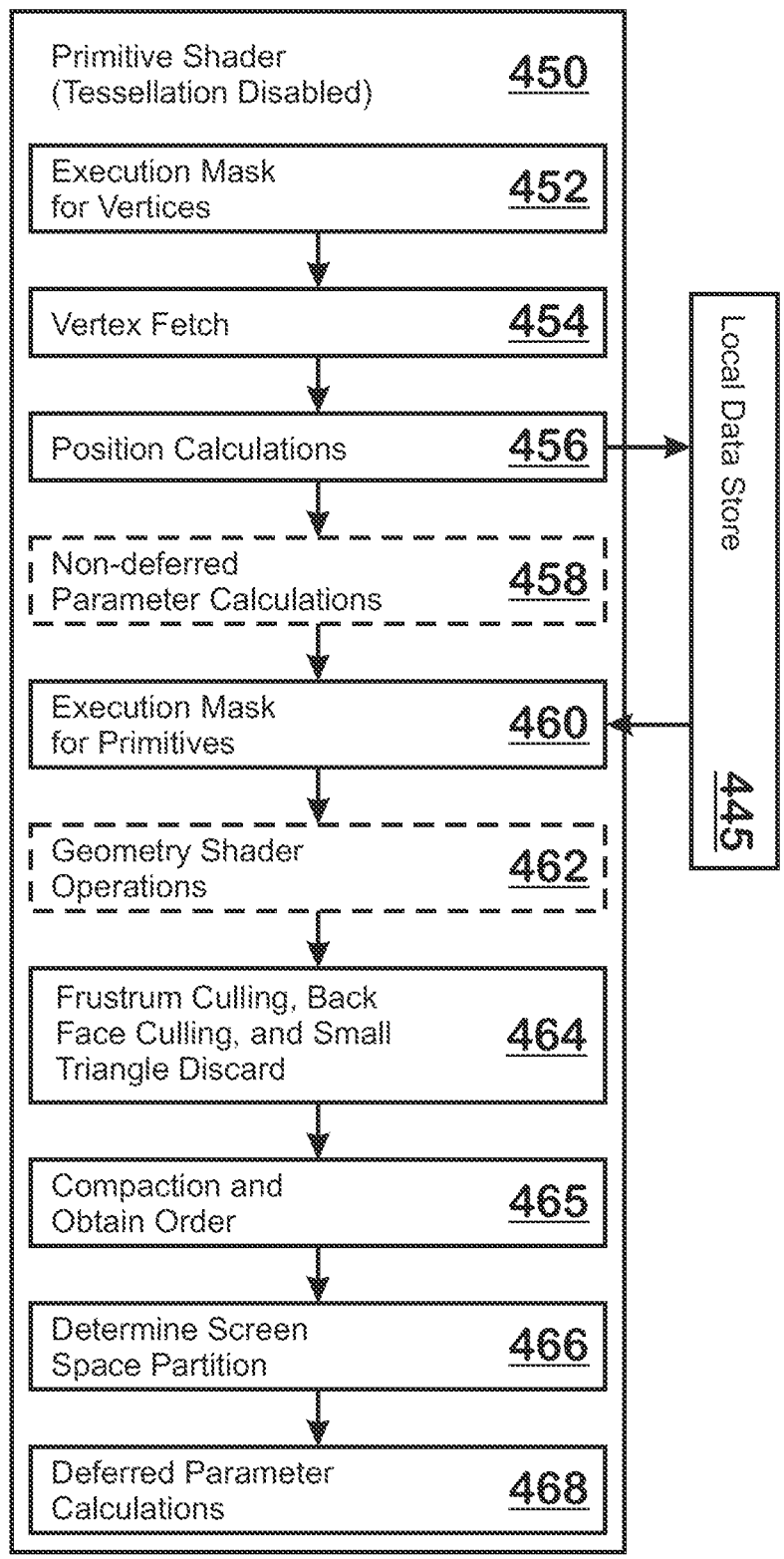
FIGS. 4B and 4C illustrate examples of a shader program to be executed for a primitive shader when tessellation is disabled (FIG. 4B) and when tessellation is enabled (FIG. 4C)
Figure 4C:
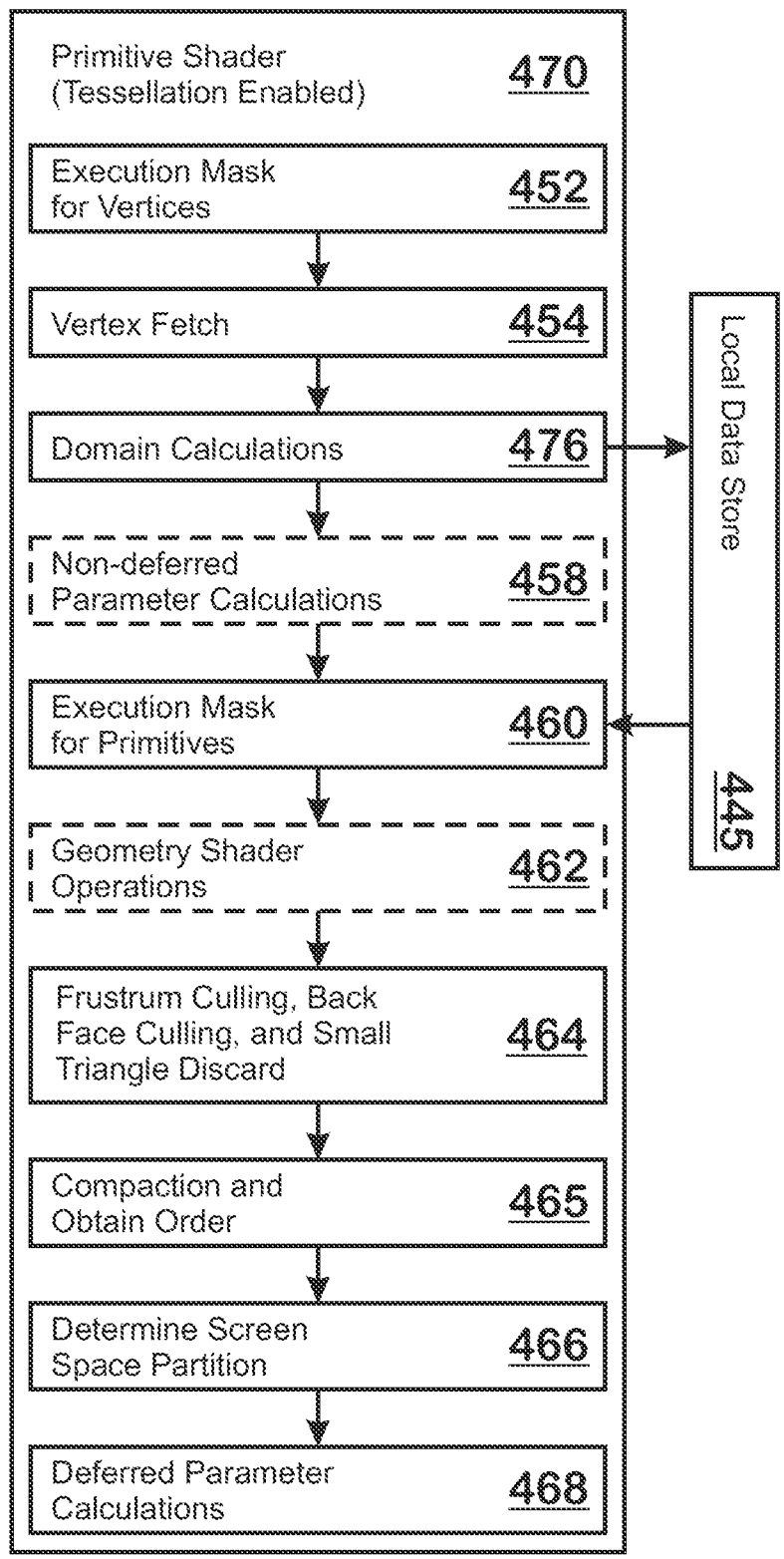

FIGS. 4B and 4C illustrate examples of a shader program to be executed for the primitive shader 404 when tessellation is disabled (FIG. 4B) and when tessellation is enabled (FIG. 4C). The tessellation disabled primitive shader 450 and the tessellation enabled primitive shader 470 represent shader programs generated by the driver 122 from user-provided shader code and from other shader code available to the driver 122 (for example, in system memory 104, or in some other memory unit in the device 100 such as in the APD 116). More specifically, the driver 122 obtains certain user-provided shader code from an application 126 or other entity, compiles that user-provided shader code, and merges the compiled user-provided shader code with other compiled code to form the tessellation disabled primitive shader 450 or the tessellation enabled primitive shader 470.

Referring now to FIG. 4B, when tessellation is disabled, the primitive shader 404 performs the functions of the vertex shader stage 304 and the geometry shader stage 312 if geometry shading is enabled. The tessellation disabled primitive shader 450 also includes various other segments for performing operations of the primitive assembler 340. The tessellation disabled primitive shader 450 includes an execution mask for vertices segment 452, a vertex fetch segment 454, a position calculations segment 456, a non-deferred parameter calculations segment 458 (which is optional, as indicated by the dotted lines), an execution mask for primitives segment 460, a geometry shader operations segment 462, a frustum culling, back face culling, and small triangle discard segment 464, a compaction and obtain order segment 465, a determine screen space partition segment 466, and a deferred parameter calculations segment 468. The tessellation disabled primitive shader 450 exports the positions and parameters for use by the screen-space pipelines 432.

The execution mask for vertices segment 452 sets up an execution mask that indicates which work-items in a wavefront are to execute the shader program (and which are to be switched off, via, e.g., predication) until the next change in the execution mask. Execution masks are used so that single wavefronts can be spawned to perform different types of work. More specifically, each wavefront spawned in the APD 116 is spawned to execute a particular shader program. Because the tessellation disabled primitive shader 450 is a single shader program, the APD 116 spawns wavefronts to execute that shader program. However, this shader program performs work that requires different numbers of work-items of the wavefront. For vertex related work (e.g., the vertex fetch segment 454 and the position calculations segment 456), each work-item works on a single vertex. For primitive related work (e.g., the geometry shader operations segment 462, the frustum culling, back face culling, and small triangle discard segment 464, and the determine screen space partition segment 466), each work-item works on a primitive. In general, fewer work-items are used for primitive-related operations than for vertex-related operations. For this reason, execution masks are used to disable or enable work-items of a wavefront when the type of work that a wavefront executing the tessellation disabled primitive shader 450 changes.

The execution mask for vertices segment 452 sets the number of active work-items to a number appropriate for executing the vertex-related operations. The vertex fetch segment 454 fetches vertex data based on received indices. More specifically, prior to the tessellation disabled primitive shader 450 (e.g., in the input assembler stage 302), vertex data is handled as pointers to the vertex data—"indices"—rather than as the vertex data themselves. Indices are lightweight "pointers" to vertex data that allow certain operations to occur, such as duplicate vertex detection, identification of primitives from vertices based on a selected primitive topology, and other operations, without handling the large amounts of data associated with the vertex data. At some point, however, the actual vertex data does get processed, such as when performing vertex position transforms. At this point, vertex data is obtained based on the indices. The vertex fetch segment 454 performs these operations, fetching vertex data from memory based on the indices and loading the vertex data into registers for processing by the shader engines 132 executing the tessellation disabled primitive shader 450.

The position calculations segment 456 is derived from the user-provided code for the vertex shader stage 304 and performs position transforms (e.g., converting vertex positions from model space to view space, which include modelview transforms or other transforms associated with the vertex shader stage 304) specified by the user-provided vertex shader code for the vertices fetched by the vertex fetch segment 454. To generate the position calculations segment 456, the driver 122 extracts the instructions associated with performing position transforms from the user-provided vertex shader code. In one example, the driver 122 identifies the instructions associated with performing position transformations based on the outputs specified by the vertex shader code provided by the application 126. More specifically, the vertex shader code identifies what outputs are associated with transformed vertex positions. The driver 122 identifies the instructions upon which these outputs depend as the instructions to be included in the position calculations segment 456. The position calculations segment 456 exports the calculated positions to the local data store 445 for use by other portions of the tessellation disabled primitive shader 450 and the screen-space pipelines 350.

The non-deferred parameter calculations 458 include calculations for vertex non-position attributes that are not deferred until after culling and small triangle discard (by the frustum culling, back face culling, and small triangle discard segment 464). These calculations are also based on the user-provided code for the vertex shader stage 304. Some parameter calculations cannot be deferred because the driver 122 is unable to isolate them from the vertex shader program and thus cannot shift them in time until after culling. As with vertex position transforms for the position calculations segment 456, the driver 122 extracts the instructions for the non-position attribute calculations from the user provided vertex shader code by examining the outputs specified by that code that are associated with the attributes for which calculation is not to be deferred and identifying the instructions upon which those outputs depend.

The execution mask for primitives segment 460 sets the execution mask for the work-items of the wavefront based on the number of work-items that are to perform per-primitive operations. The execution mask for primitives segment 460 can reduce or increase the number of active work-items, but typically, the number of active work-items is reduced because there are multiple vertices per primitive and work items are assigned one per vertex for vertex processing and one per primitive for primitive processing. Data for primitive processing that is dependent on the results of vertex operations executed by work-items is available to work-items in a wavefront executing primitive operations via registers available to SIMD units 138, via the local data store 445, or through some other mechanism. The local data store 445 is a memory unit that is shared among SIMD units 138 in a shader engine 132 and is also accessible to units outside of shader engines 132. Unlike the position buffer 346 and parameter buffer 348 of FIG. 3C, the local data store 445 is not dedicated to vertex positions and vertex attributes, respectively.

If geometry shading is active, then the tessellation disabled primitive shader 450 includes the geometry shader operations segment 462. These operations, which are per-primitive, are operations specified by user-provided code for the geometry shader stage 312. The driver 122 retrieves this user-provided code, compiles that code, and inserts it into the tessellation disabled primitive shader 450.

The frustum culling, back face culling, and small triangle discard segment 464 performs frustum culling, back face culling, and small triangle discard for primitives. Frustum culling includes discarding primitives that are outside of the "view frustum," or area of three-dimensional space visible to the camera. Back face culling includes discarding primitives whose back face faces the camera. Small triangle discard includes discarding triangles that are too small to be visible (e.g., because the small triangles would not cover any screen pixel, or for some other reason). In FIG. 3C, the fixed-function primitive assemblers 340 perform these operations but with the primitive shader 404 of FIG. 4A, these operations are performed on the programmable processing units 202.

The compaction and obtain order segment 465 compacts culled data into a format suitable for efficient processing by the screen-space pipeline 432. More specifically, the compaction and obtain order segment 465 removes the vertices for culled primitives (and which are not also used by non-culled primitives) and compacts the remaining data into a packed form. The compaction and obtain order segment 465 also obtains an order number from the scheduler 136. The order number assists with maintaining API order and helps instruct the screen-space pipelines 432 regarding the order in which to process primitives received from the world-space pipelines 430. The scheduler 136 maintains a global order for work processed through the graphics processing pipeline 400 and assigns order numbers to work as the work passes through the graphics processing pipeline 400.

The determine screen space partition segment 466 determines, for each primitive, one or more screen subdivisions 324 that the primitive overlaps. The purpose of this segment is to identify which screen-space pipeline 432 is to receive which primitive, based on the portions of the screen assigned to the different screen-space pipelines 432. In the example of FIG. 3C, this function is implemented in the fixed function primitive assemblers 340 but is implemented in instructions to be executed on the parallel processing units 202 in FIGS. 4A-4D. In some implementations, the determine screen space partition segment 466 includes an opcode whose function is to identify, based on a given set of coordinates, which screen subdivision 324 the coordinates belong to, thus providing hardware acceleration for the determine screen space partition segment 466.

The deferred parameter calculations segment 468 performs attribute calculations after primitives are culled in the frustum culling, back face culling, and small triangle discard segment 464. The advantage of performing these operations at this time is that non-visible primitives have been discarded and so attributes are not determined for primitives that do not contribute to the final scene. The driver 122 obtains instructions for the deferred parameter calculations segment 468 from the user-provided code for the vertex shader stage 304. The driver 122 extracts the instructions for determining these parameters by identifying outputs indicated as being associated with these parameters and identifying the instructions in the code for the vertex shader stage 304 upon which the outputs depend. Deferring attribute processing until after the operations associated with the frustum culling, back face culling, and small triangle discard segment 464 prevents the attribute processing from occurring for primitives that would be culled and thus not contribute to the final scene.

The tessellation enabled primitive shader 470 includes similar segments as the tessellation disabled primitive shader 450 except that instead of performing operations for the vertex shader stage 304, the tessellation enabled primitive shader 470 performs operations for the domain shader stage 310. Thus, instead of including instructions derived from application-provided code for the vertex shader stage 304 for position calculations in a position calculation segment 456, the tessellation enabled primitive shader 470 includes a domain evaluation segment 476 that includes instructions for performing the functionality of the domain shader stage 310, the instructions being derived from application-provided code associated with that stage.

With the primitive shader 404, much of the functionality performed in fixed function hardware (e.g., the primitive assembler 340) in the example graphics processing pipeline of FIG. 3C is instead performed by the programmable processing units 202. This shift from fixed-function to programmable hardware provides certain benefits, described now in conjunction with FIG. 4D.

Figure 4D:
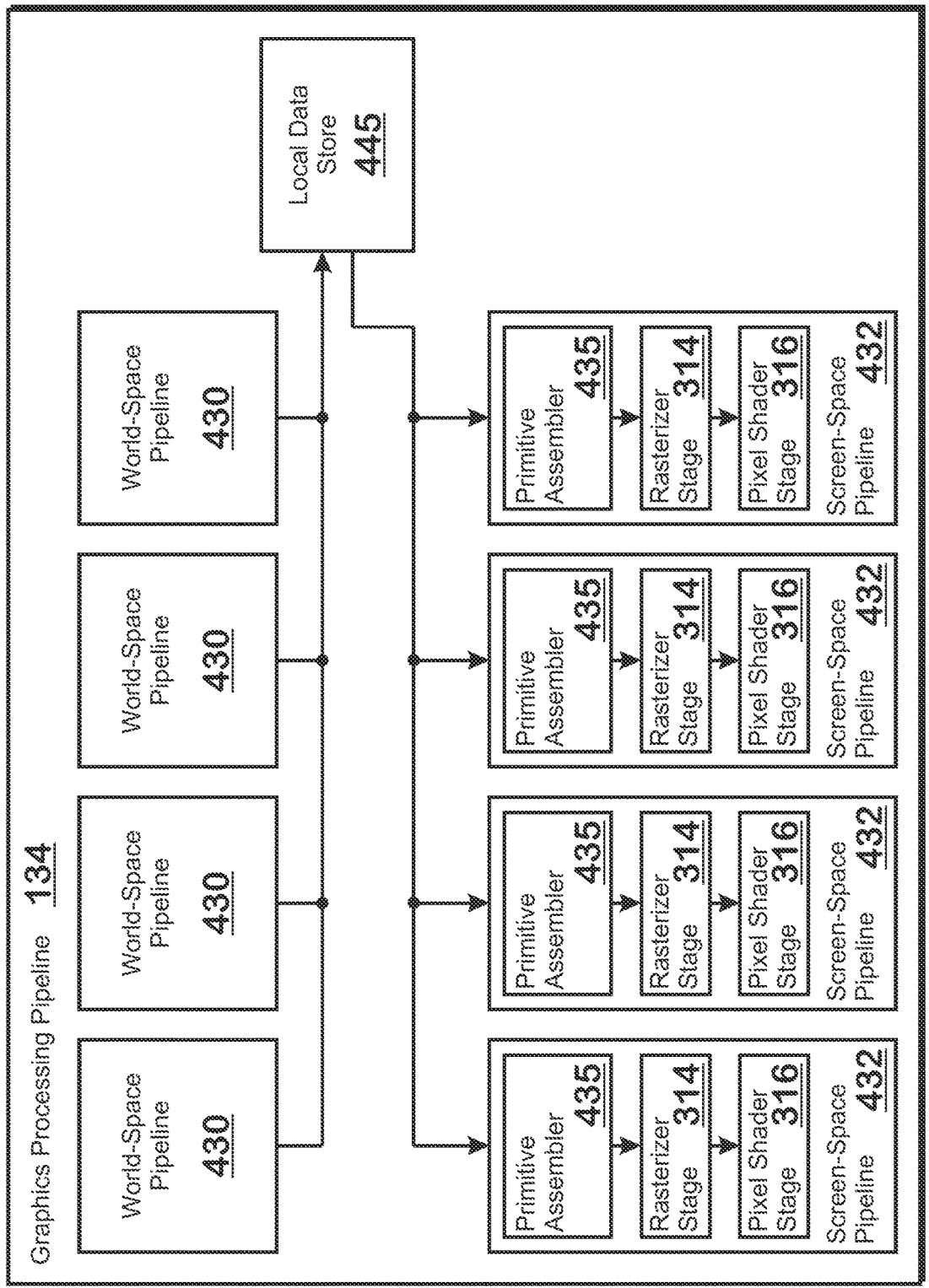
FIG. 4D illustrates additional details of the graphics processing pipeline, according to an example.

FIG. 4D illustrates additional details of the graphics processing pipeline 400, according to an example. The graphics processing pipeline 400 includes multiple world-space pipelines 430 and multiple screen-space pipelines 432. In FIG. 4D, the world-space pipelines 432 process vertices and primitives substantially as described above with respect to FIGS. 4A-4C. Among other things, the primitive shader 404 (specifically the determine screen space partition segment 466) identifies which screen-space pipeline 432 is to receive the primitives. The primitive assemblers 435 fetch the data designated for the associated screen-space pipeline 432 (i.e., the screen-space pipeline 432 in which the primitive assembler 435 is found) from the local data store 445, assemble the data into triangles for the rasterizer stage 314, and pass the triangles to the rasterizer stage 314. The primitive assemblers 435 may perform other primitive operations, such as culling not performed by the primitive shader 404, and the like.

Instead of with a crossbar 342, data is passed from the world-space pipelines to the screen-space pipelines 432 via the local data store 445. More specifically, the primitive shaders 404 export the data for primitives to be processed by the screen-space pipelines 432 (e.g., vertices, indications of which vertices constitute primitives, vertex attributes, and the like) to the local data store 445 and the screen-space pipelines 432 fetch appropriate data from the local data store 445. With the fixed function primitive assemblers 340 and crossbar 342 of FIG. 3C, the limited dedicated buffering memory (e.g., buffers 345 in the rasterizer stage 314) results in bottlenecks in certain situations. However, the primitive shader 404 is able to use the much more flexible local data store 445 for transmission of data from world-space pipeline 430 to screen-space pipeline 432 and is therefore not bound by the limitations of dedicated memory (e.g., the position buffer 346 and the parameter buffer 348).

In addition, the flexible primitive shader 404 allows for a "decoupling" of world-space pipelines from screen-space pipelines. More specifically, the crossbar 342 of FIG. 3C is hard-wired between the world-space pipelines 330 and the screen-space pipelines 350 and achieves its functions in a fixed manner. The data path is thus fixed from the output of the world-space pipelines 330, through the crossbar 342, and to the screen-space pipelines 350. By not using the crossbar 342 and using the local data store 445, the data path is more flexible. World-space pipeline export data (e.g., processed vertices and primitives) can be produced by units other than the world-space pipelines 430 (such as the processor 102) and simply fed to the local data store 445, or the world-space pipelines 430 can produce processed vertices and primitives and export that data to the local data store 445 for retrieval and processing by a unit other than the screen-space pipelines 432 (such as the processor 102).

In addition, not using the crossbar 342 means allowing for more world-space pipelines and screen-space pipelines than are allowed currently due to the complexity of the crossbar 342. Removal of the crossbar 342 also allows for a flexible number of world-space pipelines 330 to be connected to a flexible number of screen-space pipelines 350, since no crossbar with fixed number of inputs and outputs is present.

Further, the local data store 445 is a general purpose memory and is available for use by compute shaders (i.e., general purpose programs not necessarily related to graphics processing) executing in the parallel processing units 202. Dedicated memory of the position buffer 346 and parameter buffer 348 is not available to the compute shaders. Thus use of the local data store 445 instead of the crossbar 342 allows for removal of the dedicated memory that would be unusable for compute shaders from the APD 116, thus reducing chip area consumption or use of the chip area that would be used for the dedicated memory for other purposes.

Figure 5:
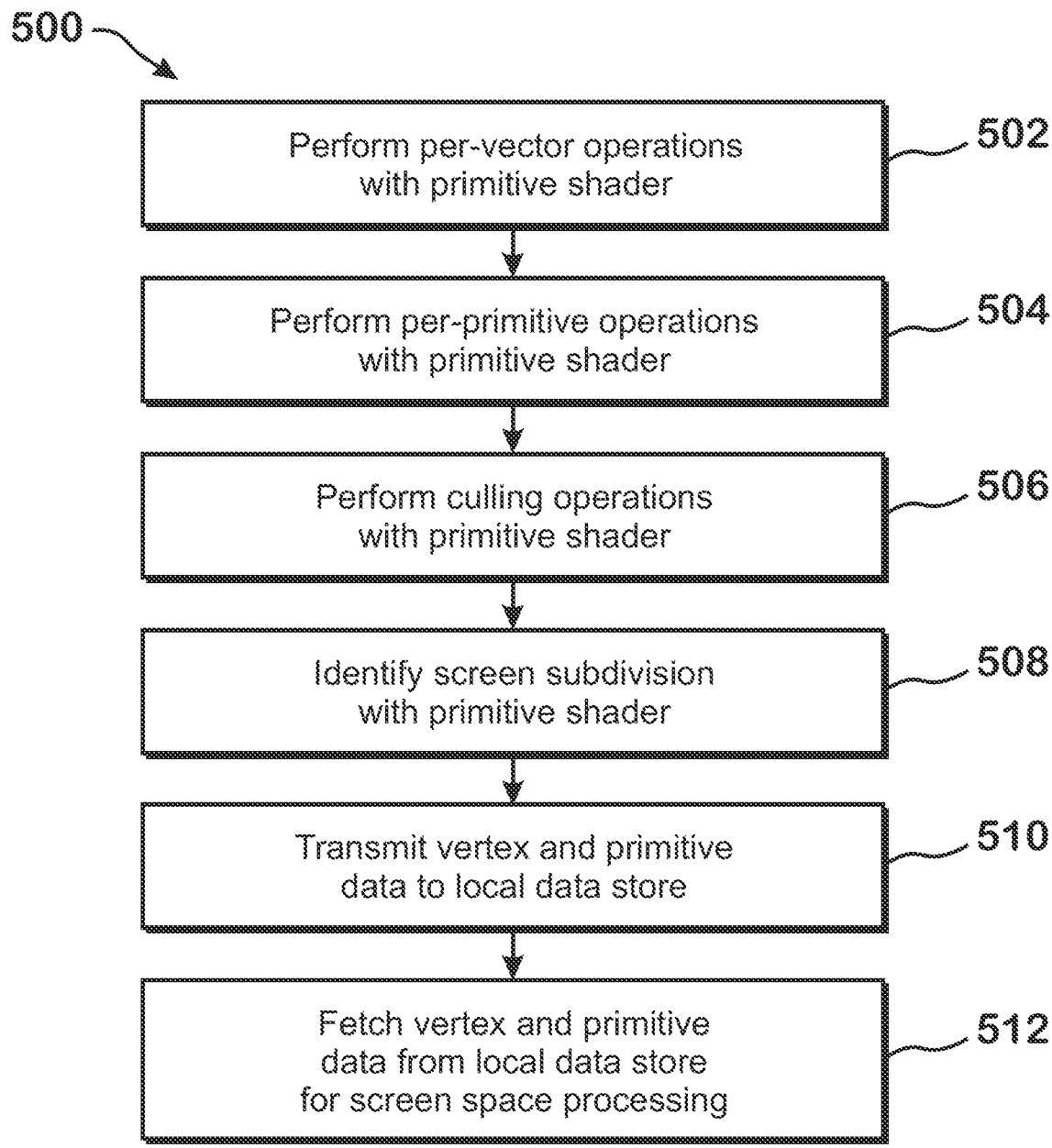
FIG. 5 is a flow diagram of a method for performing the functionality of a primitive shader, according to an example.

FIG. 5 is a flow diagram of a method 500 for performing the functionality of a primitive shader, according to an example. Although described with respect to the system shown and described with respect to FIGS. 1-4D, it should be understood that any system configured to perform the method, in any technically feasible order, falls within the scope of the present disclosure.

As shown, the method 500 begins at step 502, where a shader program for a primitive shader 404 executing on parallel processing units 202 performs per-vertex operations (e.g., operations for the position calculations segment 456 or for the domain evaluation segment 476). These per-vertex operations include vertex position transforms specified in and extracted from application-provided code for a vertex shader stage 304, where tessellation is disabled, or include vertex position transforms specified in and extracted from application-provided code for a domain shader stage 310. At step 504, the shader program performs per-primitive operations (e.g., geometry shading operations (462)). These per-primitive operations are specified in and extracted from application-provided code for a geometry shader stage 312. Step 504 is optional, based on whether geometry shading is enabled.

At step 506, the shader program performs culling operations (464). The culling operations include one or more of frustum culling, back face culling, and small triangle discard. At step 508, the shader program identifies screen subdivisions overlapped by the primitives associated with the work performed in steps 502-506 (466). At step 510, the shader program transmits vertex data and primitive data to the local data store 445 for use by screen-space pipelines 350. At step 512, the screen-space pipelines 350 fetch the vertex data from the local data store 445 for processing.

Steps 502 through 508 are performed by the same shader program. Therefore, because each wavefront that spawns is spawned to execute a single shader program, individual wavefronts execute steps 502-508.

A method for performing three-dimensional graphics rendering is provided. The method includes performing per-vertex operations on a set of vertices with a primitive shader program executing in parallel processing units. The method also includes performing culling operations on a set of primitives associated with the set of vertices, to generate a set of culled primitives, the culling operations being performed with the primitive shader. The method further includes identifying one or more screen subdivisions for the set of culled primitives, with the primitive shader. The method also includes transmitting the set of culled primitives to a set of screen-space pipelines based on the identified screen subdivisions of the set of culled primitives.

An accelerated processing device (APD) is provided. The APD comprises a graphics processing pipeline and a plurality of parallel processing units. The graphics processing pipeline includes a primitive shader stage configured to execute a primitive shader program on the plurality of parallel processing units. The primitive shader program is configured to perform per-vertex operations on a set of vertices, perform culling operations on a set of primitives associated with the set of vertices, to generate a set of culled primitives, identifying one or more screen subdivisions for the set of culled primitives, with the primitive shader, and transmitting the set of culled primitives to a set of screen-space pipelines of the graphics processing pipeline based on the identified screen subdivisions of the set of culled primitives.

A computing device is also provided. The compute device includes a central processing unit and an accelerated processing device (APD). The APD comprises a graphics processing pipeline and a plurality of parallel processing units. The graphics processing pipeline includes a primitive shader stage configured to execute a primitive shader program on the plurality of parallel processing units. The primitive shader program is configured to perform per-vertex operations on a set of vertices received from the central processing unit, perform culling operations on a set of primitives associated with the set of vertices, to generate a set of culled primitives, identifying one or more screen subdivisions for the set of culled primitives, with the primitive shader, and transmitting the set of culled primitives to a set of screen-space pipelines of the graphics processing pipeline based on the identified screen subdivisions of the set of culled primitives.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing three-dimensional graphics rendering, the method comprising:
   performing per-vertex operations on a set of vertices at a primitive shader stage of a graphics processing pipeline, with a primitive shader program executing in parallel processing units;
   performing culling operations on a set of primitives associated with the set of vertices, to generate a set of culled primitives, the culling operations being performed with the primitive shader at the primitive shader stage;
   identifying one or more screen subdivisions for the set of culled primitives, with the primitive shader at the primitive shader stage; and
   transmitting the set of culled primitives to a set of screen-space pipelines based on the identified screen subdivisions of the set of culled primitives, the transmitting performed with the primitive shader and via a general purpose local data store memory, wherein transmitting the set of culled primitives to the set of screen-space pipelines is performed via the general purpose local data store memory and not via a fixed function crossbar or via a dedicated position buffer and parameter buffer,
   wherein the primitive shader stage comprises a programmable stage of the graphics processing pipeline prior to a screen-space pipeline of the graphics processing pipeline.

2. The method of claim 1, wherein:
   tessellation is enabled and the per-vertex operations comprise domain shader operations for evaluating barycentric coordinates produced by a tessellator stage of a graphics processing pipeline.

3. The method of claim 1, wherein:
   tessellation is disabled and the per-vertex operations comprise vertex shader operations for transforming vertex positions for a vertex shader stage of a graphics processing pipeline.

4. The method of claim 1, further comprising:
   performing operations for determining non-position attributes for vertices associated with the set of culled primitives, the operations for determining the non-position attributes being derived from vertex shader code for a vertex shader stage of a graphics processing pipeline.

5. The method of claim 1, wherein:
   geometry shading is enabled and the method further comprises performing geometry shading operations on the set of primitives associated with the set of vertices, the geometry shading operations being derived from geometry shader code for a geometry shader stage of a graphics processing pipeline.

6. The method of claim 1, wherein transmitting the set of culled primitives to the set of screen-space pipelines comprises:
   transmitting the set of culled primitives to the local data store memory; and
   transmitting the set of culled primitives from the local data store memory to the set of screen-space pipelines.

7. The method of claim 1, wherein identifying one or more screen subdivisions comprises:
   for each primitive in the set of culled primitive, identifying one or more screen subdivisions covered by that primitive.

8. The method of claim 7, wherein transmitting the set of culled primitives to the set of screen-space pipelines based on the identified screen subdivisions comprises:
   for each primitive in the set of culled primitives, identifying one or more screen-space pipelines associated with the screen subdivisions covered by that primitive; and
   transmitting the primitive to the identified one or more screen-space pipelines.

9. An accelerated processing device (APD), comprising:
   a graphics processing pipeline;
   a general purpose local data store memory, and
   a plurality of parallel processing units,
   wherein the graphics processing pipeline includes a programmable primitive shader stage configured to execute a primitive shader program on the plurality of parallel processing units, the primitive shader stage being prior to a screen-space pipeline of the graphics processing pipeline, the primitive shader program configured to:
   perform per-vertex operations on a set of vertices;
   perform culling operations on a set of primitives associated with the set of vertices, to generate a set of culled primitives;
   identifying one or more screen subdivisions for the set of culled primitives, with the primitive shader; and
   transmitting the set of culled primitives to a set of screen-space pipelines of the graphics processing pipeline, via the local data store memory, based on the identified screen subdivisions of the set of culled primitives, wherein transmitting the set of culled primitives to the set of screen-space pipelines is performed via the general purpose local data store memory and not via a fixed function crossbar or via a dedicated position buffer and parameter buffer.

10. The APD of claim 9, wherein the graphics processing pipeline is in a state where tessellation is enabled and the per-vertex operations comprise:
    domain shader operations for evaluating barycentric coordinates produced by a tessellator stage of a graphics processing pipeline.

11. The APD of claim 9, wherein the graphics processing pipeline is in a state where tessellation is disabled and the per-vertex operations comprise:
    vertex shader operations for transforming vertex positions for a vertex shader stage of a graphics processing pipeline.

12. The APD of claim 9, wherein the primitive shader program is further configured to:
    perform operations for determining non-position attributes for vertices associated with the set of culled primitives, the operations for determining the non-position attributes being derived from vertex shader code for a vertex shader stage of the graphics processing pipeline.

13. The APD of claim 9, wherein the graphics processing pipeline is in a state where geometry shading is enabled and the primitive shader program is further configured to perform geometry shading operations on the set of primitives associated with the set of vertices, the geometry shading operations being derived from geometry shader code for a geometry shader stage of the graphics processing pipeline.

14. The APD of claim 9, wherein the primitive shader program is configured to identify one or more screen subdivisions by:
for each primitive in the set of culled primitive, identifying one or more screen subdivisions covered by that primitive.

15. The method of claim 14, wherein the primitive shader program is configured to transmit the set of culled primitives to the set of screen-space pipelines based on the identified screen subdivisions by:
for each primitive in the set of culled primitives, identifying one or more screen-space pipelines associated with the screen subdivisions covered by that primitive; and
transmitting the primitive to the identified one or more screen-space pipelines.

16. A computing device, comprising:
a central processing unit, and
an accelerated processing device (APD), the APD comprising:
a graphics processing pipeline;
a general purpose local data store memory, and
a plurality of parallel processing units,
wherein the graphics processing pipeline includes a programmable primitive shader stage configured to execute a primitive shader program on the plurality of parallel processing units, the primitive shader stage being prior to a screen-space pipeline of the graphics processing pipeline, the primitive shader program configured to:
perform per-vertex operations on a set of vertices received from the central processing unit;
perform culling operations on a set of primitives associated with the set of vertices, to generate a set of culled primitives;
identifying one or more screen subdivisions for the set of culled primitives, with the primitive shader; and
transmitting the set of culled primitives to a set of screen-space pipelines of the graphics processing pipeline, via the local data store memory, based on the identified screen subdivisions of the set of culled primitives, wherein transmitting the set of culled primitives to the set of screen-space pipelines is performed via the general purpose local data store memory and not via a fixed function crossbar or via a dedicated position buffer and parameter buffer.

17. The computing device of claim 16, wherein the graphics processing pipeline is in a state where tessellation is enabled and the per-vertex operations comprise:
domain shader operations for evaluating barycentric coordinates produced by a tessellator stage of a graphics processing pipeline, the domain shader operations being derived from a domain shader program provided by the central processing unit.

18. The computing device of claim 16, wherein the graphics processing pipeline is in a state where tessellation is disabled and the per-vertex operations comprise:
vertex shader operations for transforming vertex positions for a vertex shader stage of a graphics processing pipeline, the vertex shader operations being derived from a vertex shader program provided by the central processing unit.

* * * * *